3,322,846
Patented May 30, 1967

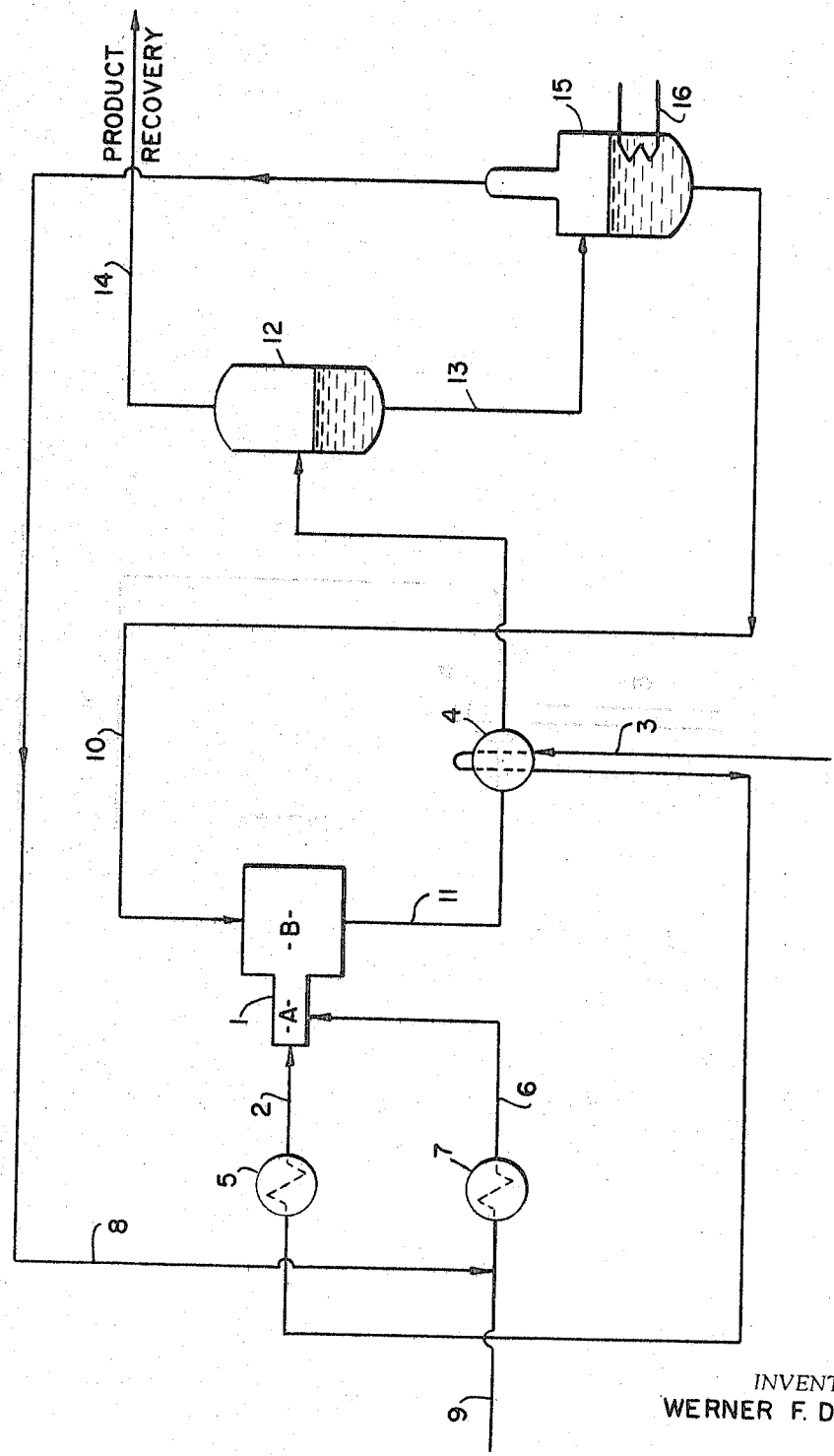

3,322,846
THERMAL CONVERSION OF HYDROCARBONS
Werner F. Dreier, Grand-Lancy, Geneva, Switzerland, assignor to Mobil Oil Corporation, a corporation of New York
Filed Apr. 23, 1964, Ser. No. 361,994
9 Claims. (Cl. 260—679)

The present invention relates to a novel process for thermal conversion of hydrocarbons to less saturated hydrocarbons and, more particularly, to a process for thermal conversion of lower molecular weight saturated hydrocarbons into lower molecular weight, normally gaseous less saturated hydrocarbons. Still more particularly, the present invention relates to such a process with improved recovery of the desired reaction products from such thermal conversions.

It is known to those skilled in the art that hydrocarbons can be converted to less saturated hydrocarbons by subjecting the hydrocarbons to relatively high temperatures sufficient to effect such conversions. In specific illustrations, and depending on the temperatures employed for the pyrolysis, propane can be pyrolyzed to a reaction product in which acetylene or ethylene is the predominating less saturated reaction product; ethane can be pyrolyzed to ethylene and/or acetylene as the predominant product; light naphthas ($C_6$) can be pyrolyzed to ethylene and/or acetylene; methane can be thermally converted to acetylene; isobutylene to mixtures of methyl acetylene and propadiene, etc. Those skilled in the art are further aware that, for such thermal conversions, certain processes are carried out by separately introducing into a suitable reactor a stream of the hydrocarbon to be converted and a stream of a "carrier gas," and the two streams are subjected to mixing in the reactor. In such processes, the "carrier gas" and the hydrocarbons are both preheated prior to being introduced into the reactor with the carrier gas being preheated to a temperature substantially above the temperature required for desired conversion of the hydrocarbon. By control over the relative amounts of carrier gas and hydrocarbons separately introduced into the reaction zone, and the temperature differential between the preheated carrier gas and hydrocarbon, the hydrocarbon introduced into the reactor is raised to conversion temperature by sensible heat abstracted from the carrier gas. In such processes, the reaction product generally comprises, in addition to the desired less saturated hydrocarbons, feed hydrocarbon that remains unreacted, carrier gas and, in some processes, certain products of reaction of the carrier gas with the feed hydrocarbons.

As an example, such prior art processes include use of steam and/or flue gas as the carrier gas. In the use of steam, the reaction product contains, in addition to the desired hydrocarbons less saturated than the feed hydrocarbons, oxides of carbon formed by reaction of the steam with the feed hydrocarbons, as well as the carrier gas itself. In conventional practice, the reaction product is quenched promptly following the thermal conversion so as to minimize undesirable further and/or side reactions, and the quenched reaction product is processed for desired product recovery. When steam is used as the carrier gas, the quenched reaction product can be reduced in temperature sufficient to condense the carrier gas and separate same from the reaction product but, as is apparent to those skilled in the art, the oxides of carbon present in the reaction product generally require resort to means, such as absorption techniques, for separating the oxides of carbon (i.e., CO and $CO_2$) from the normally gaseous product hydrocarbons less saturated than the feed hydrocarbons.

In further example, such prior art processes include the use of a suitable flue gas (from combustion of hydrocarbons) as the carrier gas. As the flue gas comprises a substantial constituent of the reaction product mixture, and is not condensible at practical temperatures, it is apparent that separaion of the flue gas from the normally gaseous desired reaction products also requires resort to extensive and expensive processing and apparatus so as to separate the carrier gas from the reaction product.

In accordance with this invention, it has been found that major objectionable features of such processes for thermal conversion of hydrocarbons to less saturated hydrocarbons can be obviated by use of carbon disulfide as the carrier gas. Thus, when the process is carried out with such use of carbon disulfide, not only can the carrier gas ($CS_2$) be easily removed by condensation at a practical temperature (e.g., about 46° C. or lower) thereby obviating the need for extensive and expensive processing and required apparatus for separation of carrier gas from the desired reaction product but, of considerable importance, it has also been found that the carbon disulfide is so unreactive with the feed hydrocarbons at the high temperature required for their conversion whereby contamination of the reaction product with products of reaction between the carbon disulfide and the feed hydrocarbons is obviated or minimized to a substantially insignificant extent. From equilibrium considerations, it would generally be expected that $CS_2$ in the presence of hydrogen would decompose, or be converted appreciably to $H_2S$, sulfur and methane. It has been found, however, that under the conditions of the present process, such equilibrium is not attained and, for practical purposes, the $CS_2$ remains substantially inert.

Although, in general, the present invention embodies use of carbon disulfide as the carrier gas for thermal conversion of a wide variety of hydrocarbons to less saturated hydrocarbons that are normally gaseous, and which thermal conversions may require temperatures that may vary over a very wide range depending on the particular hydrocarbon to be converted and the desired reaction product, the invention in more specific aspects relates to use of carbon disulfide as a carrier gas in such thermal conversions of hydrocarbons that require temperature in the range of from about 1300° F. to about 2800° F., and more specifically, from about 1500° F. to about 2400° F. for the desired thermal conversion. For purposes of illustration and not limitation, the following are typical of several thermal conversions to which the present invention relates and temperatures suitable for producing reaction products comprising the stated unsaturated hydrocarbons as the predominant conversion product from the more saturated feed hydrocarbons.

| Feed | Predominant Conversion Product | Temperature, °F. |
|---|---|---|
| Propane | Acetylene | 2,400 |
| Do | Ethylene | 1,600 |
| Ethane | do | 1,700 |
| Ethylene | Acetylene | 1,900–2,000 |
| Light Naphthas ($C_6$) | Ethylene | 1,500–1,800 |
| Do | Acetylene | 2,100 |

In practice of this invention, the hydrocarbon feed is mixed with the $CS_2$ at temperatures sufficiently high so as to avoid or minimize reaction between the $CS_2$ and the hydrocarbons. The conversion temperature for the hydrocarbon feed is attained by abstraction of sensible heat from the $CS_2$ whereby, in practice of this invention, the hydrocarbon feed as a separate stream is mixed with the $CS_2$ at a temperature sufficient to provide such a conversion temperature. In this manner, it has been found that the $CS_2$ does not substantially, if at all, react with the hydrocarbon feed but, of considerable importance, it enables efficient separation of the $CS_2$ from the product stream by condensing out the $CS_2$ by quenching the product stream at a relatively low temperature of below about 46° C. An added advantage of the present process is that $CS_2$ has a low heat of vaporization whereby, after condensing the $CS_2$ to separate the $CS_2$ from the hydrocarbon-containing product stream, the separated $CS_2$ can readily and economically be vaporized for reuse in the process as the carrier gas. In separation of the $CS_2$ from the product stream, it is preferable to carry out the separation under elevated pressure so as to increase the temperature at which the $CS_2$ will condense whereby the product stream will not need to be cooled to as low a temperature as would be the case at atmospheric pressure.

In reference to the relative amount of $CS_2$ to employ in practice of this invention for providing the required temperature for a particular conversion reaction, the following equation sets forth a relationship for satisfactory operating conditions:

$$\frac{M_1}{C_2 \Delta T_2}\{Q+C_i\Delta T_1\} - M_2 = 0$$

in which $M_1$ is the mass of the hydrocarbon feed (lbs./hr.)
$C_i$ is the specific heat of the hydrocarbon feed (average of $T_1+T_2$)
$\Delta T_1$ is $T_1-T_2$ with $T_1$ being the conversion temperature and $T_2$ the preheat temperature of the feed
$Q$ is the heat of reaction in B.t.u./lb. of reactant hydrocarbons/hr.
$M_2$ is the mass of $CS_2$ (lbs./hr.)
$C_2$ is the average specific heat of the $CS_2$ (average of $T_1+T_3$)
$\Delta T_2$ is $T_3-T_2$ where $T_3$ is the preheat temperature of the $CS_2$.

The accompanying drawing diagrammatically illustrates one manner of practicing the invention in a process which utilizes carbon disulfide as a quench medium for the reaction product.

In the drawing, there is shown reactor 1 into which there is introduced via line 2 the hydrocarbon feed to be thermally converted, said hydrocarbon feed having been introduced into the system by feed conduit 3 which passes through heat exchanger 4 for preliminary heating of the feed and thence through heat exchanger 5 for further preheating of the hydrocarbon feed to desired preheat temperature. Also introduced into reactor 1 via line 6 is the appropriate amount of carbon disulfide heated to desired temperature by having passed through heat exchanger 7, the carbon disulfide passing into heat exchanger 7 being comprised of recycle carbon disulfide via line 8 and, when required, make-up carbon disulfide is fed into line 9. The separate streams introduced into reactor 1 are thoroughly mixed in the reaction zone A of reactor 1 and the reaction product passes into quench zone B of reactor 1 wherein the reaction product is quenched by means of a spray of carbon disulfide introduced into quench zone B via line 10. The quenched product is withdrawn from quench zone B through line 11 that passes through heat exchanger 4 whereby, by indirect heat exchange, the feed hydrocarbons in line 3 are preheated and the reaction product containing the carbon disulfide passes into vessel 12. In vessel 12, maintained at a temperature sufficient to condense $CS_2$, the carrier gas condenses and is withdrawn as liquid bottoms via line 13 whereas the gaseous reaction product, devoid of carrier gas, is withdrawn as overhead via line 14 and passes to product recovery. The liquid bottoms ($CS_2$) from vessel 12 withdrawn via line 13 is passed into vessel 15 in which the $CS_2$ is partially gasified by means of heater 16 with the gaseous overhead being taken off via line 8 to provide recycle $CS_2$ for passage through heat exchanger 7 and into reactor 1 via line 6; and the liquid $CS_2$ taken off as bottoms from vessel 15 provides the $CS_2$ for passage into quench zone B of reactor 1 via line 10 for use as the quench medium for the reaction product passing into quench zone B from reaction zone A.

In order to further describe the invention, the following embodiments are set forth for purposes of illustration and not limitation.

(A)

80 parts per hour of hexane at 800° F. and 560 parts per hour of $CS_2$ (preheated to 2400° F.) are separately charged into a reactor with provision of reactor effluent at a reactor exit temperature of 1600° F. By quenching the reactor product to a temperature below 46° C., whereby condensation of $CS_2$ in the reactor product occurred the reactor product minus the condensed $CS_2$ analyzed as follows:

| | Weight percent |
|---|---|
| $H_2$ | 1.4 |
| $C_2H_4$ | 30 |
| $C_2H_6$ | 3 |
| $C_2H_2$ | 1 |
| $C_1$ | 15 |
| $C_3$ | 9 |
| $C_4$ | 6 |
| $C_5$ | 1 |
| $C_6$ (hexane) | 35 |
| $H_2S$ | Trace |

The foregoing data illustrate that not only was a substantial (65%) total conversion of the hexane obtained but, also, that conversion product comprised a substantial amount of unsaturated compounds, mainly ethylene.

(B)

In the use of propane, but otherwise under the same conditions of (A), the reactor product, minus the condensed $CS_2$, analyzed as follows:

| | Weight percent |
|---|---|
| $H_2$ | 0.8 |
| $C_2H_4$ | 33.0 |
| $C_2H_6$ | 4.2 |
| $C_1$ | 22.0 |
| $C_3$ (propane) | 40.0 |
| $H_2S$ | 0.2 |

Similar to the results obtained from use of hexane, the propane was also substantially converted (i.e., total conversion of about 60%) to a conversion product comprising a substantial amount of unsaturated hydrocarbons, mainly ethylene.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for thermal conversion of hydrocarbons to less saturated hydrocarbons which comprises separately introducing into a thermal conversion zone (1) a hydrocarbon feed, at a temperature below its thermal conversion temperature, to be thermally converted and (2) carbon disulfide in a sufficient quantity at a temperature higher than said conversion temperature to provide in said reaction zone upon mixing with said hydrocarbon feed a mixture having a temperature sufficent to convert said hydrocarbon, and withdrawing from said reaction zone a reaction product comprising hydrocarbons less saturated than said feed hydrocarbon.

2. A method, as defined in claim 1, wherein the feed hydrocarbon is a lower molecular weight hydrocarbon thermally convertible to less saturated hydrocarbons at a temperature in the range of from about 1300 to about 2400° F.

3. A method, as defined in claim 1, wherein the feed hydrocarbon contains from 1 to 6 carbon atoms.

4. A method, as defined in claim 1, wherein the feed hydrocarbon is heated prior to mixing with the carbon disulfide but to a temperature below conversion temperature.

5. A method, as defined in claim 1, wherein the reaction product withdrawn from the conversion zone is quenched to a temperature sufficiently low to condense the carbon disulfide present in the reaction product.

6. A method, as defined in claim 5, wherein the condensed carbon disulfide is separated from the reaction product, heated to said temperature higher than the conversion temperature, and recycled to the conversion zone.

7. A method, as defined in claim 6, wherein the reaction product is quenched by contact with the condensed carbon disulfide.

8. A method, as defined in claim 1, wherein the feed hydrocarbon is a member from the group consisting of hexane and propane.

9. A continuous method for thermal conversion of hydrocarbons to less saturated hydrocarbons which comprises separately and continuously introducing into a thermal conversion zone (1) a hydrocarbon feed containing from 1 to 6 carbon atoms preheated to a temperature below conversion temperature, said hydrocarbon being thermally convertible at from about 1300 to about 2400° F., and (2) carbon disulfide in sufficient quantity and at a temperature higher than said conversion temperature to provide in said zone upon mixing with said feed a mixture having a temperature sufficient to convert said feed, quenching the conversion zone effluent comprising carbon disulfide and hydrocarbons less saturated than the feed to a temperature sufficiently low to condense the carbon disulfide, separating the condensed carbon disulfide from the quenched effluent, recycling a portion of the condensed carbon disulfide into contact with said effluent as the quenching medium for said effluent, heating another portion of said condensed carbon disulfide to a temperature higher than said conversion temperature and recycling said carbon disulfide to the reaction zone.

References Cited

UNITED STATES PATENTS

| | | | |
|---|---|---|---|
| 1,898,301 | 2/1933 | Herrmann | 260—679 |
| 2,167,471 | 7/1939 | Auerbach | 260—679 |
| 2,176,962 | 10/1939 | Grebe | 260—683 |
| 2,350,159 | 5/1944 | Folkins et al. | 260—683 |
| 2,415,477 | 2/1947 | Folkins | 260—683 |
| 2,449,635 | 9/1948 | Barr | 260—679 |
| 2,714,126 | 7/1955 | Keith | 260—679 |
| 2,959,629 | 11/1960 | Lindahl | 260—679 |

ALPHONSO D. SULLIVAN, *Primary Examiner*.